United States Patent
Larbier

(10) Patent No.: US 10,742,987 B2
(45) Date of Patent: Aug. 11, 2020

(54) METHOD FOR ANALYZING A VIDEO SEQUENCE AND EQUIPMENT FOR IMPLEMENTING SAID METHOD

(71) Applicant: ATEME, Velizy Villacoublay (FR)

(72) Inventor: Pierre Larbier, Bievres (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 15/569,446

(22) PCT Filed: Apr. 20, 2016

(86) PCT No.: PCT/FR2016/050911
§ 371 (c)(1),
(2) Date: Oct. 26, 2017

(87) PCT Pub. No.: WO2016/174329
PCT Pub. Date: Nov. 3, 2016

(65) Prior Publication Data
US 2018/0302627 A1    Oct. 18, 2018

(30) Foreign Application Priority Data

Apr. 28, 2015  (FR) ..................... 15 53792

(51) Int. Cl.
| | |
|---|---|
| *H04N 19/136* | (2014.01) |
| *H04N 19/142* | (2014.01) |
| *H04N 19/177* | (2014.01) |
| *H04N 19/51* | (2014.01) |
| *H04N 19/194* | (2014.01) |

(Continued)

(52) U.S. Cl.
CPC ......... *H04N 19/136* (2014.11); *H04N 19/132* (2014.11); *H04N 19/14* (2014.11); *H04N 19/142* (2014.11); *H04N 19/172* (2014.11); *H04N 19/177* (2014.11); *H04N 19/194* (2014.11); *H04N 19/46* (2014.11); *H04N 19/51* (2014.11)

(58) Field of Classification Search
CPC ..................................................... H04N 19/136
USPC ..................................................... 375/240.02
See application file for complete search history.

(56) References Cited

U.S. PATENT DOCUMENTS

| | | | |
|---|---|---|---|
| 2003/0004966 A1* | 1/2003 | Bolle | ...................... G06F 16/58 |
| 2003/0033347 A1 | 2/2003 | Bolle et al. | |

(Continued)

FOREIGN PATENT DOCUMENTS

| | | |
|---|---|---|
| WO | 2006/012384 A2 | 2/2006 |
| WO | 2013/049412 A2 | 4/2013 |

OTHER PUBLICATIONS

Chong-Wah Ngo et al.; "Video Partitioning by Temporal Slice Coherency", IEEE Transactions on Circuits and Systems for Video Technology, volo. 22, No. 8, 941-953. (Year: 2001).*

(Continued)

*Primary Examiner* — James M Anderson, II
(74) *Attorney, Agent, or Firm* — Young & Thompson

(57) ABSTRACT

Disclosed is a method for analyzing a set of images of a video sequence with a view to performing a processing of the sequence. The method includes: determining, in the video sequence, a plurality of disjointed consecutive sub-sequences of at least one successive image according to the type of processing to be carried out and according to the content of the video sequence; and analyzing the images of each sub-sequence determined in the video sequence.

10 Claims, 5 Drawing Sheets

(51) Int. Cl.
    *H04N 19/14*     (2014.01)
    *H04N 19/172*    (2014.01)
    *H04N 19/132*    (2014.01)
    *H04N 19/46*     (2014.01)

(56) References Cited

U.S. PATENT DOCUMENTS

| | | | |
|---|---|---|---|
| 2004/0005365 A1 | 1/2004 | Oguro et al. | |
| 2007/0116126 A1* | 5/2007 | Haskell | H04N 19/196 375/240.21 |
| 2010/0027622 A1 | 2/2010 | Dane et al. | |
| 2015/0189401 A1* | 7/2015 | Yi | H04N 21/8456 725/32 |

OTHER PUBLICATIONS

Bertini M et al: "Content-based indexing and retrieval of TV news", Pattern Recognition Letters, Elsevier, Amsterdam, NL, vol. 22, No. 5, Apr. 1, 2001 (Apr. 1, 2001), pp. 503-516, XP004233002, ISSN: 0167-8655, DOI: 10.1016/S0167-8655(00)00113-6.

Chong-Wah Ngo et al: "Video Partitioning by Temporal Slice Coherency", IEEE Transactions on Circuits and Systems for Video Technology, IEEE Service Center, Piscataway, NJ, US, vol. 11, No. 8, Aug. 1, 2001 (Aug. 1, 2001), XP011014230, ISSN: 1051-8215.

International Search Report, dated Jun. 15, 2016, from corresponding PCT/FR2016/050911 application.

\* cited by examiner

METHOD FOR ANALYZING A VIDEO SEQUENCE AND EQUIPMENT FOR IMPLEMENTING SAID METHOD

The present invention relates to a method for analyzing video sequences and a device for implementing said method. It applies in particular to analyzing a video sequence for the purpose of processing (video coding, compression, denoising, etc.) to be carried out on the sequence.

Video data generally undergo source coding intended to compress them so as to limit the resources required for their transmission and/or their storage. There are numerous coding standards, such as H.264/AVC, H.265/HEVC and MPEG-2, which can be used for this purpose.

A video sequence is considered, comprising a set of images. Many automatic processing systems for video sequences require pre-analysis. This is the case for example of compression in two passes at a variable frame rate, in which a first pass corresponding to a pre-analysis phase makes it possible mainly to determine the complexity of the sequence before the actual encoding thereof in a second pass, corresponding to a processing phase. The operations of the analysis phase are often as complex as those of the processing phase that follows. As a result, the overall processing time with pre-analysis is significantly greater than that for processing without pre-analysis.

In the case of processing by video encoding, the duration of the pre-analysis phase thus plays a prominent role in determining the total duration necessary for encoding, in other words the speed of processing of the processed sequence. It is therefore desirable to reduce the duration of the pre-analysis phase as much as possible in order to achieve high processing speeds that are compatible with the processing requirements for a video catalogue containing for example several thousand films.

The existing techniques for video sequence analysis prior to processing generally consist of successively scanning the images that compose the video sequence to be processed. Statistics are extracted at each image, then at the end of the analysis phase, a summary containing an overview of information on the sequence is calculated. The processing phase that follows takes as input the video sequence as well as the summary previously calculated.

In the case of video compression in two passes, the analysis processing carried out in the first pass can also consist of video encoding that makes it possible to extract, for each image or each sub-sequence of images, a relationship between the video quality (taking account of the compression distortion) and the frame rate obtained after compression. During the second pass, the set of these relationships is used by the encoder in order to optimally regulate the frame rate.

In the case of a video denoiser using two passes, the pre-analysis phase generally makes it possible to extract the characteristics of the noise so as to guide the denoising that is carried out during the second phase. A method for estimating the characteristics of the noise consists of removing it, then measuring statistics of the signal from which the noise has been extracted, in order to determine a difference between the noised signal and the signal after extraction of the noise characterizing the extracted noise. This operation generally presents the complexity of a complete denoising, and as in the case of video compression, approximately doubles the processing time with respect to processing carried out without pre-analysis.

Document US 2010/0027622 proposes to reduce the spatial and/or temporal resolution of a video stream prior to a first encoding pass, with the aim of reducing the calculation time in the particular case of video encoding with two passes.

Reducing the spatial resolution implies decreasing the size of the images analyzed, in a linear manner or by selecting a portion of each image. The statistics extracted during the first pass are then extrapolated in order to obtain an estimate of what would have been obtained if the entire images had been analyzed.

When the temporal resolution is modified, the image flow is reduced regularly or irregularly and only the images retained are analyzed during the first pass. As previously, the statistics of the images that are not analyzed are extrapolated.

The two methods can be combined, thus making it possible to further reduce the analysis time. Both are based on the idea that it is possible to extrapolate the missing data from the analyzed data.

It is noted however that a sampling operation combined with extrapolation can result in low-quality statistics, and as a result, this method is not used in the vast majority of practical applications.

Thus a need exists for an improved method for analyzing a video sequence that does not have the drawbacks set out above.

A need exists moreover for a method for analyzing a video sequence that is improved by reducing calculation time for an analysis phase of the sequence, within the framework of multi-pass processing.

A subject of the present invention is to propose an improved method for analyzing a video sequence within the framework of multi-pass processing.

According to a first aspect, a method is proposed for analyzing a set of images from a video sequence for the purpose of processing to be carried out on the sequence, the method comprising determining, in the video sequence, a plurality of unconnected consecutive sub-sequences of one or more successive images, and analyzing the images from each determined sub-sequence in the video sequence, in which the sub-sequences are determined depending on the type of processing to be carried out and depending on the content of the video sequence.

It is noted that the conventional analysis methods fail to recognize several important aspects, which severely detracts from their implementation:

Generally, images are not spatially homogeneous. Their centre for example, which is the principal point of interest, does not have the same complexity as their edges. The analysis results, which may comprise statistical data extracted after spatial sub-sampling, often have only a distant relationship with the results of an analysis carried out on the initial images. A typical example is noise, which changes characteristics when the size of the images is reduced.

Temporal sub-sampling also poses the problem of homogeneity of the content, which makes extrapolation of the statistics difficult. In fact, all the processing methods based on the temporal coherence of the video sequences lose effectiveness or even become inapplicable when the sequences are temporally sub-sampled. This is the case for example of the estimation of movement of a video compressor, which loses accuracy as the temporal distance between the images increases.

The conventional methods can thus lead to frame rate regulation that is not very accurate, and is difficult to use without prior training, which explains the limited use that is made of these methods in practical applications.

The proposed method has the advantage of favouring temporal sub-sampling, so as to avoid the aforementioned pitfalls inherent in spatial sub-sampling.

The proposed method also advantageously takes account of the content of the video sequence for the analysis thereof, as the inventors have identified the aforementioned problem of homogeneity of the content. The proposed method therefore facilitates extrapolation of the statistics when temporal sub-sampling is implemented during an analysis phase of a video sequence. The proposed method can thus for example take account of the type of content (film, sport, musical entertainment, etc.) analyzed within the framework of the first pass of multi-pass processing.

In addition, unlike the conventional method of document US 2010/0027622, which forms an integral part of a multi-pass encoder and is therefore not in general use, the proposed method advantageously takes account of the type of processing to be carried out on the video sequence (compression, denoising, etc.) during a processing phase, using the analysis results generated during an analysis phase using the proposed method.

For that reason, the proposed method has the advantage of being able to be adapted according to the processing to be carried out for a video sequence by taking account, for the analysis phase of the sequence, of the type of processing (compression, filtering, etc.) subsequently carried out on the sequence.

The proposed method is particularly, although not exclusively, suitable for the encoding or compression of a video sequence according to a scheme of the H.264, H.265, H.262, MPEG-2, AVC or HEVC type. But it is also suitable for encoding images according to any video encoding scheme in two passes (one pass for analysis and one pass for encoding), or for any processing of a video sequence in two passes.

In a particular implementation of the proposed method, the respective sizes of the sub-sequences and the respective gaps between two adjacent sub-sequences are determined depending on the type of processing to be carried out and depending on the content of the video sequence.

In a particular embodiment of the proposed method, the sub-sequences may have an identical size, with the exception of the last sub-sequence of the plurality of consecutive sub-sequences.

Preferably, the size of the last sub-sequence will be chosen to be greater than or equal to the size of the other sub-sequences, whether the other sub-sequences have a single size or not.

In a particular embodiment of the proposed method, with the exception of the gap between the last sub-sequence of the plurality of consecutive sub-sequences and the sub-sequence adjacent to the last sub-sequence, the respective gaps between two adjacent sub-sequences may be chosen to be identical.

In a particular embodiment, the proposed method also comprises generating analysis results of the video sequence, by extrapolation of the results of analysis of the sub-sequences of the video sequence.

In a particular implementation of the proposed method, at least one of the sub-sequences may contain only a single image.

In a particular embodiment of the proposed method, the sub-sequences are also determined depending on the speed of analysis or the accuracy of analysis.

According to a second aspect, a device is proposed for analyzing a set of images from a video sequence for the purpose of processing to be carried out on the sequence, comprising an input interface configured in order to receive the video sequence, and a sequence analysis unit, comprising a processor operationally coupled to a memory, configured in order in order to determine in the video sequence a plurality of unconnected consecutive sub-sequences of one or more successive images, depending on the type of processing to be carried out and depending on the content of the video sequence, and to analyze the images from each determined sub-sequence in the video sequence.

According to another aspect, a computer program is proposed, capable of being loaded into a memory associated with a processor, and comprising portions of code for implementing the steps of the proposed method during the execution of said program by the processor, as well as a set of data representing, for example by means of compression or encoding, said computer program.

Another aspect relates to a non-transitory storage medium for a program capable of being executed by computer, comprising a set of data representing one or more programs, said one or more programs comprising instructions so that, during the execution of said one or more programs by a computer comprising a processing unit operationally coupled with memory means and an input/output interface module, the computer is made to analyze the images of a video sequence according to the proposed method.

Other features and advantages of the present invention will become apparent from the following description of non-limitative examples, with reference to the attached drawings, wherein.

In the detailed description hereinafter of embodiments of the invention, numerous specific details are given for the purposes of better understanding. However, a person skilled in the art will understand that embodiments can be put into practice without these specific details. In other cases, well-known features are not described in detail, in order to avoid unnecessary complexity of the description.

By "sub-sampling" is meant herein any operation carrying out the extraction or the selection of sub-sequences within a video sequence, without limitation relating to the particular method or to a particular sub-sampling parameter (period, recurrence, etc.), unless otherwise stated. Sub-sampling is thus distinguished from decimation, which assumes regular extraction of sub-sequences (for example, extraction of one image every n images of the video sequence).

Figure 1:
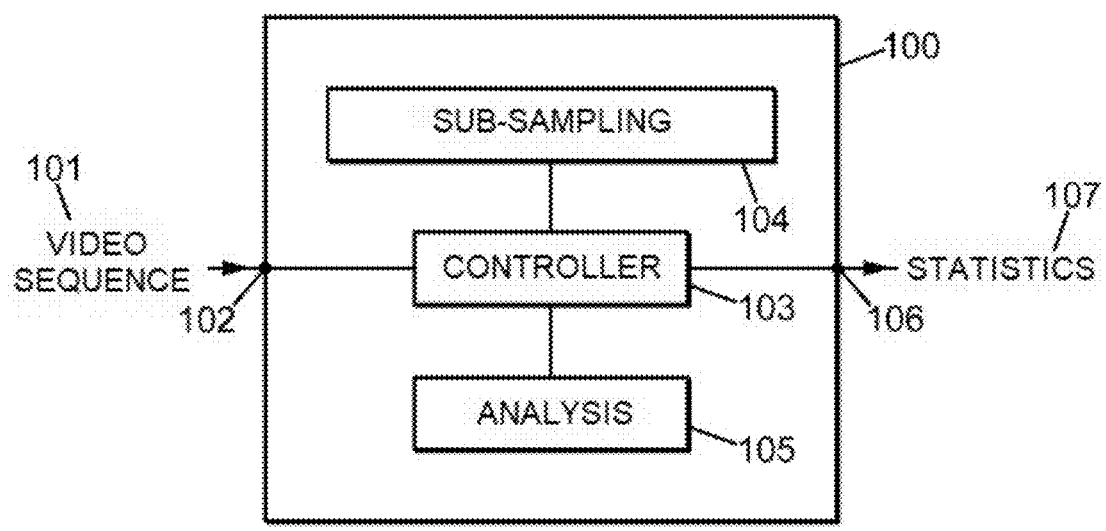
FIG. 1 is a diagram showing the architecture of a video sequence analysis device according to an embodiment of the proposed method.

With reference to FIG. 1, the video sequence analysis device 100 receives at the input 102, an input video sequence 101 to be analyzed within the framework of multi-pass processing. The analysis device 100 comprises a controller 103, operationally coupled to the input interface 102, which drives a sub-sampling unit 104 and an analysis unit 105. The data received on the input interface 102 are transmitted to the input of the sub-sampling unit.

The sub-sampling unit 104 carries out sub-sampling of the video sequence according to the proposed method by determining, in the video sequence, a plurality of unconnected consecutive sub-sequences of one or more successive images. The unit 104 generates, after sub-sampling, data representing the plurality of unconnected consecutive sub-sequences from the determined sequence, which are processed by the controller 103 which supplies as input of the analysis unit 105, the images of the plurality of unconnected sub-sequences of images from the video sequence, selected by the sub-sampling unit 104. The analysis unit 105 generates after analysis of the images of the plurality of sub-sequences of images from the video sequence received at the input, statistical data 107 relating to the input video sequence 101, which are supplied by the controller 103 on an output interface 106 of the analysis device 100.

In one or more embodiments of the proposed method, generating statistical data 107 can include extrapolating statistical data extracted by using the results of analyzing the images from the plurality of sub-sequences of images from the video sequence received at the input, so as to obtain analysis results for all of the images of the video sequence, and not only for those having actually been analyzed. By "extrapolation" is meant here any operation making it possible to generate statistical data for the images that have not been analyzed (i.e. the images that were not selected during the sub-sampling of the sequence), by using in particular, statistical data extracted for the analyzed images (i.e. the images of the plurality of sub-sequences of images from the video sequence). The analysis device 100 can thus provide at the output a set of statistics wherein the splitting of the initial video sequence into sub-sequences is not apparent. The subsequent processing can then be carried out by using the results of the analysis phase generated by the analysis device 100, without the need for them to be aware of the splitting of the video sequence carried out by the analysis device 100.

The controller 103 is configured in order to drive the sub-sampling unit 104 and the analysis unit 105, and in particular the inputs/outputs of these units. The architecture of the analysis device 100 shown in FIG. 1 is however non-limitative. For example, the input interface 102 of the analysis device 100 may be operationally coupled to an input interface of the sub-sampling unit 104. Similarly, the sub-sampling unit 104 may comprise an output operationally coupled to an input of the analysis unit 105, and the analysis unit 105 may comprise an output operationally coupled to the output interface 106.

The analysis device 100 can be a computer, a computer network, an electronic component, or another device comprising a processor operationally coupled to a memory, as well as, according to the chosen embodiment, a data storage unit, and other associated hardware elements such as a network interface and a storage medium reader for reading from a removeable non-transient storage medium and writing to such a medium (not shown in the figure). The removeable storage medium can be for example a compact disk (CD), a digital video/versatile disk (DVD), a flash drive, a USB key, etc.

Depending on the embodiment, the memory, the data storage unit or the removeable storage medium contain instructions which, when executed by the controller 103, cause this controller 103 to carry out or control the input interface 102, sub-sampling 104, analysis 105 and/or output interface 106 parts of implementation examples of the proposed method described in the present document. The controller 103 can be a component implementing a processor or a calculation unit for analyzing images according to the proposed method and the control of the units 102, 104, 105, and 106 of the analysis device 100.

The analysis device 100 can thus be in the form of software which, when it is loaded in a memory and executed by a processor, implements the analysis of a video sequence according to the proposed method.

Moreover, the analysis device 100 can be implemented in software form, as described above, or in hardware form, as an application-specific integrated circuit (ASIC), or in the form of a combination of hardware and software elements, such as for example a software program intended to be loaded and executed on a component of the FPGA (Field Programmable Gate Array) type.

Figure 2:
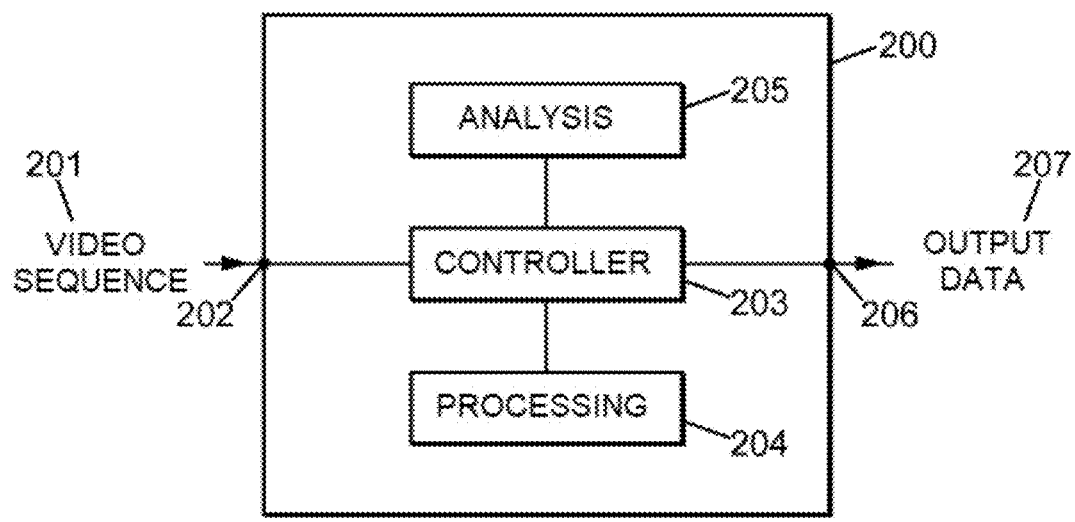
FIG. 2 is a diagram showing the architecture of a video sequence processing device according to an embodiment of the proposed method.

FIG. 2 is a diagram showing a video sequence processing device. With reference to FIG. 2, the video sequence analysis device 200 receives at the input 202, an input video sequence 201 to be processed within the framework of multi-pass processing. The analysis device 100 comprises a controller 203, operationally coupled to the input interface 202, which drives a processing unit 204 and an analysis unit 205. The data received on the input interface 202 are transmitted to the input of the analysis unit 205. The output data 207 from the processing device 200 are generated on an output interface 206.

The controller 203, analysis unit 205 and input and output interfaces 202/206 assembly forms an analysis unit capable of corresponding to the analysis unit 100 described with reference to FIG. 1, and configured in order to implement the proposed method.

The analysis unit 205 generates, after sub-sampling of the video sequence according to the proposed method, data representing a plurality of sub-sequences of images from the sequence determined by the sub-sampling, which are processed by the controller 203 or by a controller of the analysis unit, for analysis of the images of the sub-sequences. In one or more embodiments of the proposed method, the results of analysis of the images from the sub-sequences originating from the sub-sampling can be extrapolated so as to generate analysis results of all of the images of the video sequence.

The controller 203 is configured in order to drive the sub-sampling unit 205 and the analysis unit 204, and in particular the inputs/outputs of these units. In one or more embodiments, the analysis results produced by the analysis unit 205 are provided, under the supervision of the controller 205, at the input of the processing unit 204 for processing the input video sequence 201 within the framework of multi-pass processing, the analysis carried out by the analysis unit 205 corresponding to a first pass and the processing carried out by the processing unit corresponding to a second pass.

The architecture of the analysis device 200 shown in FIG. 2 is however non-limitative. For example, the input interface 202 of the analysis device 200 may be operationally coupled to an input interface of the analysis unit 205 and to an input interface of the processing unit 204. Similarly, the analysis unit 205 may comprise an output operationally coupled to an input of the processing unit 204, and the processing unit 204 may comprise an output operationally coupled to the output interface 206, in order to produce therein data corresponding to the processed video sequence 201.

In addition, the processing device 200 can be a multi-pass video encoder, a video denoiser, or any other device for the multipass processing of a video sequence wherein at least one pass comprises analysis of an input video sequence prior to processing thereof.

The processing device 200 can be a computer, a computer network, an electronic component, or another device comprising a processor operationally coupled to a memory, as well as, according to the chosen embodiment, a data storage unit, and other associated hardware elements such as a network interface and a storage medium reader for reading a removeable storage medium and writing to such a medium (not shown in the figure). Depending on the embodiment, the memory, the data storage unit or the removeable storage medium contain instructions which, when executed by the controller 203, cause this controller 203 to carry out or control the input interface 202, analysis 205, processing 204 and/or output interface 206 parts of implementation examples of the proposed method described in the present document. The controller 203 can be a component implementing a processor or a calculation unit for processing images comprising an analysis according to the proposed method and the control of the units 202, 204, 205, and 206 of the processing device 200.

Moreover, the processing device 200 can be implemented in software form, as described above, or in hardware form, as an application-specific integrated circuit (ASIC), or in the form of a combination of hardware and software elements, such as for example a software program intended to be loaded and executed on a component of the FPGA (Field Programmable Gate Array) type.

Figure 3:
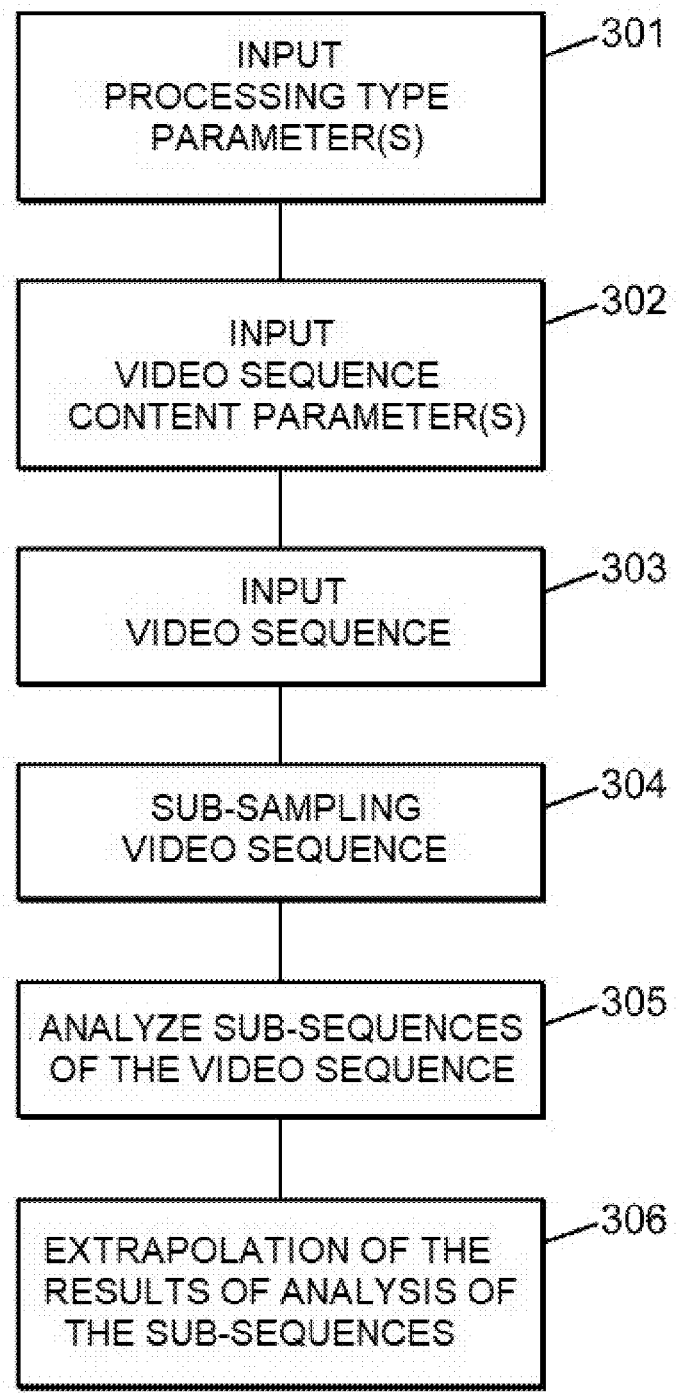
FIG. 3 is a diagram showing the proposed method according to an embodiment.

FIG. 3 shows a diagram illustrating the proposed method according to an embodiment;

One or more parameters relating to the type of processing to be carried out on the input video sequence are entered (301), so as to be taken into account during the sub-sampling phase. Similarly, one or more parameters relating to the content of the video sequence to be analyzed are entered (302), so as to be taken into account during the sub-sampling phase. The video sequence to be analyzed is produced at the input (303) so as to be analyzed. This video sequence is then sub-sampled (304) in order to determine therein a plurality of unconnected consecutive sub-sequences of images from one or more successive images depending on the type of processing to be carried out and the content of the video sequence, on the basis of the parameter(s) relating to the type of processing and the parameter(s) relating to the content of the video sequence. The images of each sub-sequence thus determined are then analyzed (305) according to a predetermined analysis method corresponding to the processing to be carried out on the sequence, in order to provide analysis results of the sub-sequences. In one or more embodiments, the analysis of the images from the sub-sequences can be followed by the extrapolation (306) of the results of this analysis, in order to generate analysis results for all of the images of the input video sequence.

Figure 4A:
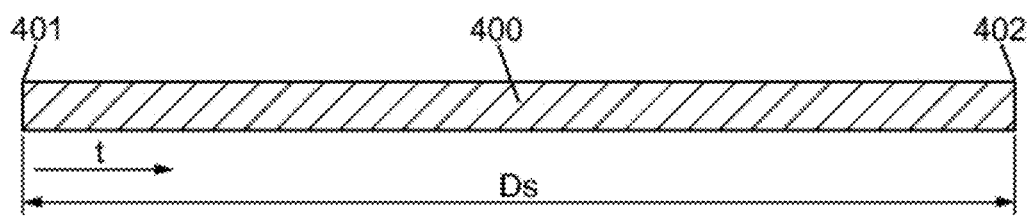
FIGS. 4a and 4b are diagrams showing the sub-sampling of a video sequence according to an embodiment of the proposed method.
Figure 4B:
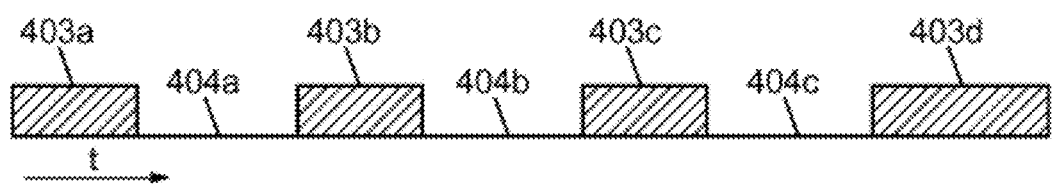

FIGS. 4a and 4b show the sub-sampling of a video sequence according to an embodiment of the proposed method.

FIG. 4a shows diagrammatically a video sequence (400) comprising a set of N images distributed over a duration $D_s$ between the first image (401) of the sequence and the last image (402) of the sequence.

FIG. 4b shows the video sequence (400) after sub-sampling. The sub-sampling of the sequence (400) operated a determination of unconnected consecutive sub-sequences (403a, 403b, 403c, 403d) of the sequence, sometimes referenced in the present application by the terms "chunk", "sub-assembly" or "packet".

The determined sub-sequences (403a, 403b, 403c, 403d) are unconnected, in that two adjacent sub-sequences are respectively separated by "holes" (404a, 404b, 404c), each hole containing at least one image of the video sequence (400). These holes (404a, 404b, 404c) correspond to the groups of images of the initial sequence (400) which, according to the proposed method, will not be analyzed.

The determined sub-sequences (403a, 403b, 403c, 403d) are consecutive, in that they result from sampling a video sequence corresponding to a duration. The sampling of the video sequence may be carried out according to the temporal progress of the sequence, in order to determine a suite of sub-sequences, among which a first sequence corresponds to the start of the video sequence, and a last sequence corresponds to the end of the video sequence.

The sub-sequences determined by the sub-sampling are not necessarily of the same size, in that they do not all contain for example the same number of images. In the example shown in FIG. 4, the sub-sequences 403a, 403b and 403c are equal in size, this size being less than or equal to that of the last sub-sequence (403d) of the sequence (400).

Thus, in one or more embodiments, the method carries out a temporal splitting into "chunks" of the video sequence to be analyzed. The chunks are sub-sequences of consecutive images that do not necessarily contain the same number of images. The images that are not in chunks will not undergo the analysis processing.

The respective sizes of the video sequence and of the sub-sequences can be expressed as a number of images, or in the form of a duration, both measurements being linked by the number of images per second of the video sequence in question. The same applies to the gap between two adjacent sub-sequences, which depending on the implementation, can be expressed as a number of images or as a duration.

The sub-sampling may be carried out on the basis of different parameters, depending on the implementation.

In one or more embodiments, the sub-sequences originating from the sub-sampling may be determined depending on a sub-sequence size, for example expressed by a number of images, identical for all the sub-sequences, optionally with the exception of one sub-sequence (preferably the last) and having a sub-sampling frequency or a sub-sampling period defining the gap between two adjacent sub-sequences.

In a variant, the sub-sequences may be determined depending on a sub-sequence size and a sub-sampling rate. For example, the sub-sequences may be determined by setting a single size (optionally with the exception of the last sub-sequence) equal to one image, and a sub-sampling rate of 1/6. The sub-sequences will therefore be determined by selecting one image every 6 images of the video sequence to be processed for the purposes of analysis. For a video sequence of one hour's duration, the duration of analysis will thus be reduced to 10 minutes. Analysis results for the parts not analyzed (i.e. not corresponding to a sub-sequence) may be deduced from the results of analysis of the sub-sequences, for example by an extrapolation method.

In one or more embodiments, the sub-sequences originating from the sub-sampling may be determined depending on a sub-sequence size, for example expressed by a number of images, identical for all the sub-sequences, optionally with the exception of one sub-sequence, a number of sub-sequences, and the size of the sequence.

Depending on the implementation, the proposed method may determine sub-sampling parameters taking account of the type of processing to be carried out and the content of the video sequence to be processed.

In one or more embodiments, the size of the last sub-sequence, corresponding to the end of the video sequence to be processed, may be chosen to be greater than or equal to those of the other sub-sequences. Thus, depending on the size of the sequence, the proposed method may merge the two last sub-sequences in the case where the size of the last sub-sequence would otherwise be less than a determined threshold, the size of the other sub-sequences if this is a single size, or the size of at least one other sub-sequence.

Figure 5A:
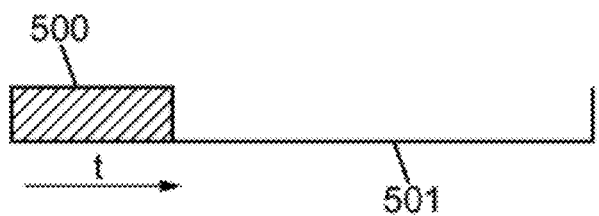
FIGS. 5a, 5b, 5c and 5d are diagrams showing the sub-sampling of a video sequence according to an embodiment of the proposed method.

In the case of regular sub-sampling of the sequence, the position of a chunk in a sub-sampling period may vary. FIG. 5a shows the case of a sub-sampling period (501) containing a chunk (500) positioned at the start of the period.

Figure 5B:
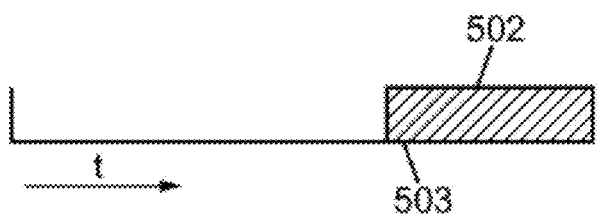

FIG. 5b shows the case of a sub-sampling period (503) containing a chunk (502) positioned at the end of the period.

Figure 5C:
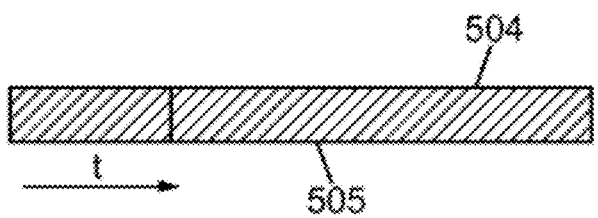

As explained above, the size of the last chunk of the sequence may be chosen to be greater than or equal to that of the other chunks. As shown in FIG. 5c, in the case of chunks positioned at the start of the sampling period, the last chunk (504) may be extended in order to cover the entire period (505), so as to ensure a more accurate analysis of the end of the video sequence.

Figure 5D:
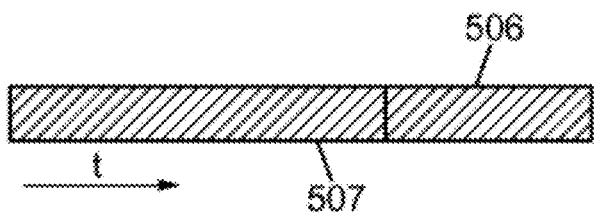

The same will apply in the case of chunks positioned at the end of the period, or in any other position of the period, as shown in FIG. 5d. The last chunk (506) may be extended in order to cover the entire period (507), so as to ensure a more accurate analysis of the end of the video sequence.

The distribution of the chunks as well as their size expressed in number of images makes it possible to deduce therefrom a gain in speed of the analysis method. In fact, if the calculation load is proportional to the number of images analyzed (which is generally the case in most applications), the proportion of images constituting the chunks can directly provide an estimation of this gain.

In one or more embodiments, the size of the chunks as well as their distribution depends on the application (on the processing carried out on the sequence). If, depending on the application, the analysis method uses temporal information such as the movement of objects in the scene, the chunks will preferably be constituted by a significant number of consecutive images. A chunk may for example be considered large in size when it comprises several thousand consecutive images. For example, within the framework of an analysis carried out for a video compression application, certain chunks may comprise approximately 3000 images. On the other hand, if the analysis processes the images independently, such as for example a measurement of luminosity, the chunks may be of a reduced size, and may for example be reduced to a single image.

In one or more embodiments, the analysis results, for example the statistical data generated by the analysis method, are extrapolated for the sub-sequences of images that are not analyzed. It is preferable in this case for the images disregarded to be of the same nature as the images analyzed, from the point of view of the statistics sent. Thanks to this extrapolation, the analysis method can provide, at the processing stage that follows, a complete set of statistics, i.e. comprising statistics corresponding to the images that have not been analyzed. Several extrapolation methods are possible, and it is advisable to choose those suitable for the type of statistics to be measured. The statistics can for example be extrapolated linearly. Thus it will be estimated that their values are placed on a straight line linking the last image of one chunk to the first image of the following chunk.

As indicated above, the size of the last chunk will preferably be chosen to be greater than or equal to that of the other chunks, and for example sufficiently large in order to correct the analysis errors of the input video sequence. The size of this end analysis window can in fact influence the analysis quality of the entire content, and it is preferable to choose a size that is sufficient in order to be able to compensate for the analysis errors at the start of the sequence that are due to the sub-sampling and to the size chosen for the analysis windows at the start of the sequence.

The operation of sub-sampling a video sequence taking account of the type of processing to be carried out and of the content of the video sequence is illustrated through the two following examples: the filtering of a video sequence in the context of video compression, and the video compression in two passes.

Filtering a Noise in Order to Denoise a Video Sequence in the Context of Video Compression One of the important aspects of the assessment of the video quality of a compressed video sequence is the visual homogeneity thereof. During the compressed video sequence, the more uniform are the defects inherent in the compression, the higher the video quality. When provision is made to remove noise before carrying out the compression task, it must therefore preferably be removed homogeneously throughout the video sequence to be denoised.

One denoising method consists of analyzing the entire video sequence beforehand, so as to identify the characteristics of the noise (for example statistical characteristics of the noise), then afterwards, to carry out filtering, using the characteristics collected, in order to reduce the noise. This denoising method therefore comprises a first phase of analysis of the noise, followed by a denoising processing, for example by filtering the noise, which uses the results of the prior analysis phase. According to the type of filtering carried out, different characteristics can be acquired during the prior analysis phase, such as for example the noise energy and the spectral amplitude thereof when it is considered to be an additive white gaussian noise.

In one or more embodiments of the proposed method, the type of content of the video sequence to be denoised is taken into account in order to determine in the video sequence a plurality of unconnected consecutive sub-sequences of one or more successive images, during the analysis phase prior to denoising.

For example, in the case where the content of the video sequence to be processed is a motion picture, the noise to be removed will typically be film grain (silver or artificially added in the case of digital cinema). The characteristics of this noise can be considered to be homogeneous throughout the film. Conversely, it is not added linearly. It can also be more important in the dark scenes than in the light scenes for example. In this case, non-linear parameters can be calculated. They can allow complete identification of the noise, by using for example the technique described in American patent application US 2004/005365. For example, non-linear parameters such as those transported in the video compression standards H.264 and HEVC may be calculated. These may in fact be used for modelling multiplicative noise with coefficients dependent on the light intensity.

In this particular non-limitative case of a video sequence the content of which is a motion picture, for the prior analysis of the sequence it is possible to carry out measurements of statistical characteristics of the noise, preferably at regular intervals, by using sub-sequences, or "chunks" of several images. Sub-sampling of the video sequence is carried out by determining in the video sequence a plurality of unconnected consecutive sub-sequences, the sub-sequences comprising one or more successive images. These sub-sequences are determined depending on the type of processing to be carried out (in this example noise filtering) and depending on the content of the video sequence (in this example a motion picture). In particular, according to the proposed method it is possible to use sub-sequences the size of which is reduced to several images, due to the fact that for example in a motion picture the noise characteristics can be considered homogeneous throughout the entire video sequence. In a particular embodiment, the use of "chunks" of 4 consecutive images makes it possible to acquire accurate noise characteristics of motion pictures, while avoiding extreme local variations in luminosity such as flash.

Similarly, for this particular case a constant gap between two adjacent sub-sequences can be chosen, as well as the duration of this gap. The average duration of the scenes in motion pictures is in fact of the order of two seconds. As a result, carrying out a measurement every second for example makes it possible to acquire information on all the scenes of the film and thus to obtain an accurate profile of the noise characteristics over the entire video sequence.

As discussed above, the size (expressed as number of images or as unit of time) of the last sub-sequence, as well as the gap between this last sub-sequence and the preceding sub-sequence, may be chosen to be different from the other sub-sequences determined by the sub-sampling.

It is possible for example to choose chunks of size Nc,1, optionally with the exception of the last chunk of the sequence which may be chosen so as to have a larger or equal size Nc,2, in order to ensure overall analysis quality as discussed above. The sampling may be carried out every second, which will allow the total number of chunks to be calculated depending on the total duration $D_s$ of the video sequence.

In one or more embodiments, an extrapolation of the results of analysis of chunks is carried out. Different methods for extrapolation of the statistics acquired can be employed if necessary. For example, it can be considered that these statistics on the non-analyzed images are identical to those of the images of the ends of the adjacent chunks. This method is particularly valid when the chunks are composed of few images, as is the case in the embodiment described previously where they are limited to 4 images.

In an embodiment, for a video sequence at 24 Hz (24 images per second) corresponding to a film, the analysis method may be configured in order to carry out measurements on 4 consecutive images (the chunks will therefore have a size equal to 4 images, optionally with the exception of the last chunk) every 24 images which represent one second of film. The analysis is therefore carried out 6 times more quickly than if all the images of the sequence were analyzed. In this embodiment, the splitting of the sequence is adapted to the content and to the type of processing subsequently carried out. In fact, the period of the chunks as well as their durations proposed above is well adapted for video sequences of the film type.

In the case of other types of content, such as televised sports events, a longer splitting period will be chosen, as editing this type of video sequence is markedly less rapid. For that reason, the invention makes it possible to optimize the speed of analysis depending on the type of content, which constitutes a significant advantage in the case of processing in batches.

Video Compression in Two Passes

Video compression in two passes generally has the objective of guaranteeing a constant video quality over the entire compressed video sequence, while respecting a specified total size. The first pass is an analysis phase, the purpose of which is for example determining the complexity of the sequence. The second pass is the compression phase itself. The latter uses the results of the analysis phase, in the preceding example the complexities obtained, in order to optimize the frame rate locally and to maintain both a constant quality and a total size.

In one or more embodiments, the analysis phase can comprise determining at each image a relationship between a compression parameter, a quantizer, and a corresponding frame rate. This relationship is generally obtained by compressing the video sequence, so that the analysis phase proves to be almost as expensive as the processing (compression) phase itself.

Several relationships between a compression parameter, a quantizer, and a corresponding frame rate have been proposed. It is possible for example to consider functions of the type $Q_p = a \cdot \log(\text{Frame rate}) + b$, where $Q_p$ is an average quantizer of the images of the video sequence to be compressed, and a and b are two parameters to be identified depending on the images of the video sequence to be encoded. In a variant, it is also possible to consider a relationship between a compression parameter, a quantizer, and a corresponding frame rate, constructed by logarithmic extrapolation from measured points Qp, Frame rate.

In one or more embodiments, the statistical summary produced at the end of the analysis phase is constituted for each image from a relationship Quantizer, Frame rate. According to the proposed method, a plurality of unconnected consecutive sub-sequences of one or more successive images is determined in the video sequence. The images of each sub-sequence are analyzed in order to produce, for each image of each sub-sequence analyzed, a relationship Quantizer, Frame rate.

In one or more embodiments, statistics for the non-analyzed parts can be generated by extrapolation by using the results of analysis of the sub-sequences. In the aforementioned example, several methods for the generation of analysis results for the parts of the sequence that have not been analyzed are possible. For example, analysis results can be generated by linear interpolation of the relationships Quantizer, Frame rate obtained by analysis of the images of the sub-sequences. This amounts to linear variation of the parameters a and b of the relationship $Q_p = a \cdot \log(\text{Frame rate}) + b$ described previously.

The proposed method makes it possible to reduce considerably the complexity of this analysis phase due to the fact that within the framework of the analysis phase, a sub-sampling phase is undertaken, which takes account of the type of processing to be carried out (in this example compression) and of the content of the video sequence. In one or more embodiments, sub-sampling parameters are chosen, taking account of the type of processing to be carried out and of the content of the video sequence to be processed.

For example, in the case where the video sequence to be compressed is a motion picture (for example within the framework of a video-on-demand application), the relationship between the compression parameter(s) and the frame rate obtained varies little. In other words, films have characteristics that are substantially homogeneous, at least locally. For that reason, it is not necessary to carry out the analysis on the entire film, as sub-sequences of a few seconds correctly distributed are sufficient to provide the necessary information for the second pass.

The video sequence containing a film can for example be cut into sub-sequences of duration equal to ten seconds, the analysis only being carried out every minute of the content, which determines the gap between two adjacent sub-sequences. Results of analysis (for example the complexity) for the areas that are not analyzed can be obtained by extrapolation of the results of analysis of the sub-sequences, which introduces inaccuracy which may be compensated for during the processing phase. In one or more embodiments, in order to facilitate this compensation and to obtain the required size, the extreme end of the sequence is fully analyzed, choosing a size for the last sub-sequence that is larger than that of the other sub-sequences. For example, the last sub-sequence can be chosen corresponding to the last minutes of the sequence, in the case where the content thereof is a film. This last sequence can in particular be composed of the last two minutes of the sequence, i.e. approximately 3000 images.

In the case of a two-hour film, the choice of the sub-sampling parameters proposed above in order to take account of the content of the sequence within the framework of compression processing (sizes of the sub-sequences and gaps between two adjacent sub-sequences) leads to analyzing only approximately 22 minutes of the film, i.e. only 18% of the images. The gain in terms of calculation time is therefore approximately 5.5.

Studies on hundreds of motion pictures have shown that this splitting method makes it possible to obtain a quality that cannot be distinguished from full analysis.

In one or more embodiments, an objective of speed of analysis, accuracy of analysis, or a criterion representing a compromise between speed and accuracy of analysis is also taken into account. It is in fact possible to modify the distribution of the analyzed areas in order to further accelerate the analysis phase, or to improve the accuracy of the analysis. For example, a compromise is determined between the speed of analysis and the accuracy thereof, and the distribution of the sub-sequences determined is modified depending on the type of processing to be carried out and depending on the content of the video sequence to be processed, according to whether the speed of analysis or the quality thereof takes precedence.

When the speed of analysis takes precedence, the respective duration of the sub-sequences determined depending on the type of processing to be carried out and depending on the content of the video sequence to be processed can be reduced, for example by a predetermined factor corresponding to the sought gain in speed of analysis. In a particular embodiment, this can be obtained by reducing the duration of the sub-sequences analyzed by half, by reducing the duration of the sub-sequences, for example from 10 s to 5 s.

Conversely, in the case where the accuracy of analysis takes precedence, which may become necessary when the content is very inhomogeneous (as in the case for example of sequences of television images) the respective duration of the sub-sequences determined depending on the type of processing to be carried out and depending on the content of the video sequence to be processed can be increased, for example by a predetermined factor corresponding to the sought gain in accuracy of analysis. In a particular embodiment, this can be obtained by increasing the duration of the sub-sequences analyzed, or by increasing the duration of the final sub-sequence.

Figure 6:
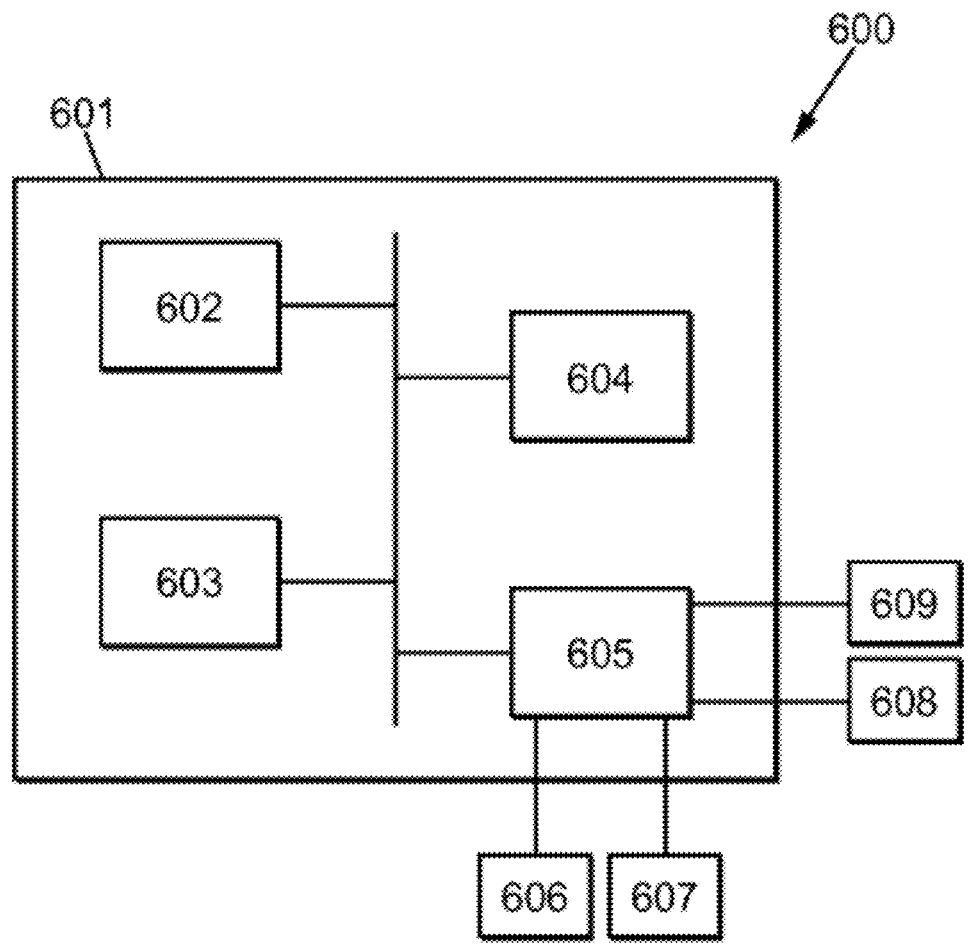
FIG. 6 shows an embodiment of a computer system for implementing the proposed method.

Embodiments of the method for analyzing a video sequence can be at least partially implemented on practically any type of computer, independently of the platform used. For example, as shown in FIG. 6, a computer system (600) that can correspond to the units for the analysis of a video sequence and processing of a video sequence shown in FIGS. 1 and 2 or be coupled operationally to these elements, comprises a data processing unit (601), which comprises one or more processors (602), such as a central processing unit (CPU) or another hardware processor, an associated memory (603) (for example a random access memory (RAM), a cache memory, a flash memory, etc.), a storage device (604) (for example a hard disk, an optical disk such as a CD or a DVD, a flash memory key, etc.), and numerous other elements and functionalities typical of current computers (not shown).

The data processing unit (601) also comprises a input/output interface module (605) that controls the different interfaces between the unit (601) and input and/or output means of the system (600). The system (600) can in fact also comprise input means, such as a keyboard (606), a mouse (607) or a microphone (not shown). Moreover, the computer (600) can comprise output means, such as a monitor (608) (for example, a liquid crystal display (LCD) monitor, an LED display monitor or a cathode ray tube (CRT) monitor). The computer system (600) can be linked to a network (609) (for example, a local area network (LAN), a wide area network (WAN) such as the internet, or any other similar type of network) via a network interface connection (not shown). A person skilled in the art will understand that there are numerous different types of computer systems (for example, a desktop computer, a portable computer, or any other computer system capable of executing computer-readable instructions), and the aforementioned input and output means can adopt other forms currently known or subsequently to be developed.

Generally, the computer system (600) comprises at least the minimal processing, input and/or output means required in order to put into practice one or more embodiments of the proposed analysis method. For example, the processor (602) is capable of being configured in order to execute a computer program comprising portions of code for implementing an analyzer, configured in order to carry out the analysis of a video sequence provided at input according to the different embodiments of the proposed analysis method. The storage device (604) will preferably be chosen to be capable of storing the data corresponding to the results of the analysis and the processing of the video sequence.

A person skilled in the art will understand that one or more elements of the aforementioned computer system (600) can be located at a remote site and be linked to other elements over a network. In addition, one or more embodiments can be implemented on a distributed system comprising a plurality of nodes, where each portion of the implementation can be situated on a different node inside the distributed system. In one or more embodiments, the node can correspond to a computer system. In a variant, the node can correspond to a processor with an associated physical memory. The node can also correspond to a processor with a shared memory and/or shared resources. Moreover, software instructions for carrying out one or more embodiments can be stored on a non-transient computer-readable medium such as a compact disk (CD), a diskette, a tape, or any other computer-readable storage device.

According to the embodiment chosen, certain acts, actions, events or functions of each of the methods described in the present document can be carried out or take place in a different order to that wherein they have been described, or can be added, merged, or indeed not carried out or not take place, according to circumstances. Moreover, in certain embodiments, certain acts, actions or events are carried out or take place concurrently and not successively.

Although described through a certain number of detailed embodiments, the proposed encoding method and the equipment for implementing the method comprise different variants, modifications and improvements that will appear in an obvious manner to a person skilled in the art, with the understanding that these different variants, modifications and improvements form part of the scope of the invention, as defined by the claims which follow. In addition, different aspects and characteristics described above can be implemented together, or separately, or even substituted for one another, and the set of different combinations and sub-combinations of the aspects and characteristics form part of the scope of the invention. Moreover, it is possible that certain systems and items of equipment described above do not incorporate all of the modules and functions described for the preferred embodiments.

The invention claimed is:

1. A method, carried out by a computer, for analyzing a set of images from a video sequence for processing to be carried out on the sequence, the method comprising:
   determining in the video sequence a plurality of unconnected consecutive sub-sequences of one or more successive images, said unconnected consecutive sub-sequences respectively separated by holes;
   analyzing the images of each determined sub-sequence in the video sequence; and
   generating an analysis result of the video sequence, by extrapolation of results of analysis of the sub-sequences of all of the images of the video sequence,
   wherein the sub-sequences are determined depending on a type of processing to be carried out and depending on a content of the video sequence,
   wherein the sub-sequences are also determined depending on a speed of analysis, and
   wherein a respective duration of the sub-sequences is determined depending on the type of processing to be carried out and depending on the content of the video sequence, and is reduced by a predetermined factor corresponding to the sought gain in speed of analysis.

2. The method according to claim 1, wherein respective sizes of the determined sub-sequences and respective gaps between adjacent pairs of the determined sub-sequences are determined depending on the type of processing to be carried out and depending on the content of the video sequence.

3. The method according to claim 2, wherein the sub-sequences, except for the last sub-sequence of the plurality of consecutive sub-sequences, are each determined so as to have an identical size.

4. The method according to claim 3, wherein a size of the last sub-sequence is determined to be greater than or equal to the identical size of the other sub-sequences of the plurality of consecutive sub-sequences.

5. The method according to claim 2, wherein, except for a gap between the last sub-sequence of the plurality of consecutive sub-sequences and the sub-sequence adjacent to the last sub-sequence, the respective gaps between adjacent pairs of sub-sequences are identical.

6. The method according to claim 1, wherein at least one of the determined sub-sequences contains only a single image.

7. The method according to claim 1, wherein the determined sub-sequences are also determined depending on an accuracy of the analysis.

8. A device for analyzing a set of images from a video sequence for processing to be carried out on the sequence, comprising:
   a controller operationally coupled to an input interface that receives the video sequence; and
   a sequence analysis unit, comprising a processor coupled operationally to a memory, the sequence analysis unit configured to:
      determine in the video sequence a plurality of unconnected consecutive sub-sequences of one or more successive images, depending on a type of processing to be carried out and depending on a content of the video sequence, said unconnected consecutive sub-sequences are respectively separated by holes,
      the sub-sequences being also determined depending on a speed of analysis, and
      a respective duration of the sub-sequences i) being determined depending on the type of processing to be carried out and depending on the content of the video sequence, and ii) being reduced by a predetermined factor corresponding to the sought gain in speed of analysis;
      analyze the images of each determined sub-sequence in the video sequence; and
      generate an analysis result of the video sequence, by extrapolation of results of analysis of the sub-sequences of all of the images of the video sequence.

9. A non-transitory computer readable storage medium having stored thereon a program comprised of computer-executable instructions that, upon being executed by a computer having at least a processing unit operationally coupled with a memory and an input/output interface module, causes the computer to carry out the method for analyzing a set of images from a video sequence according to the method of claim 1.

10. The method according to claim 1, wherein adjacent pairs of the determined sub-sequences are unconnected so as to be separated from each other by one or more images of the video sequence that are determined so as to be exempted from being analyzed.

* * * * *